United States Patent
Reumann et al.

(10) Patent No.: US 7,984,007 B2
(45) Date of Patent: Jul. 19, 2011

(54) PROACTIVE PROBLEM RESOLUTION SYSTEM, METHOD OF PROACTIVE PROBLEM RESOLUTION AND PROGRAM PRODUCT THEREFOR

(75) Inventors: John Reumann, Croton-on-Hudson, NY (US); Debanjan Saha, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 1233 days.

(21) Appl. No.: 11/619,462

(22) Filed: Jan. 3, 2007

(65) Prior Publication Data

US 2008/0162688 A1 Jul. 3, 2008

(51) Int. Cl.
*G06F 17/00* (2006.01)
*G06N 5/02* (2006.01)
(52) U.S. Cl. .............. 706/48; 700/1; 709/230; 370/252
(58) Field of Classification Search .............. 706/48; 709/230; 700/1; 370/252
See application file for complete search history.

(56) References Cited

U.S. PATENT DOCUMENTS

| | | | |
|---|---|---|---|
| 6,147,975 A * | 11/2000 | Bowman-Amuah | 370/252 |
| 6,587,556 B1 | 7/2003 | Judkins et al. | |
| 2002/0123983 A1 | 9/2002 | Riley et al. | |
| 2002/0143933 A1 | 10/2002 | Hind et al. | |
| 2006/0023638 A1 * | 2/2006 | Monaco et al. | 370/252 |
| 2006/0168055 A1 * | 7/2006 | Wixted et al. | 709/206 |

* cited by examiner

*Primary Examiner* — Jeffrey A Gaffin
*Assistant Examiner* — Kalpana Bharadwaj
(74) *Attorney, Agent, or Firm* — Law Office of Charles W. Peterson, Jr.; Brian P. Verminski, Esq.

(57) ABSTRACT

A proactive problem resolution system, method of proactive problem resolution and program product therefor. User sensors extract data from user interaction with a computer terminal and pass extracted data to a sniffer agent. The sniffer agent checks for an indication of a user problem by comparing user behavior data against behavior data from previously encountered problems. When the sniffer finds a match, the computer terminal user may be asked if assistance is needed or the user may be automatically referred to the help desk. If a solution already exists for a problem that corresponds to the user behavior, that solution(s) is(are) presented at the computer terminal. Computer terminal users automatically receive problem support, even before it would otherwise be requested.

30 Claims, 17 Drawing Sheets

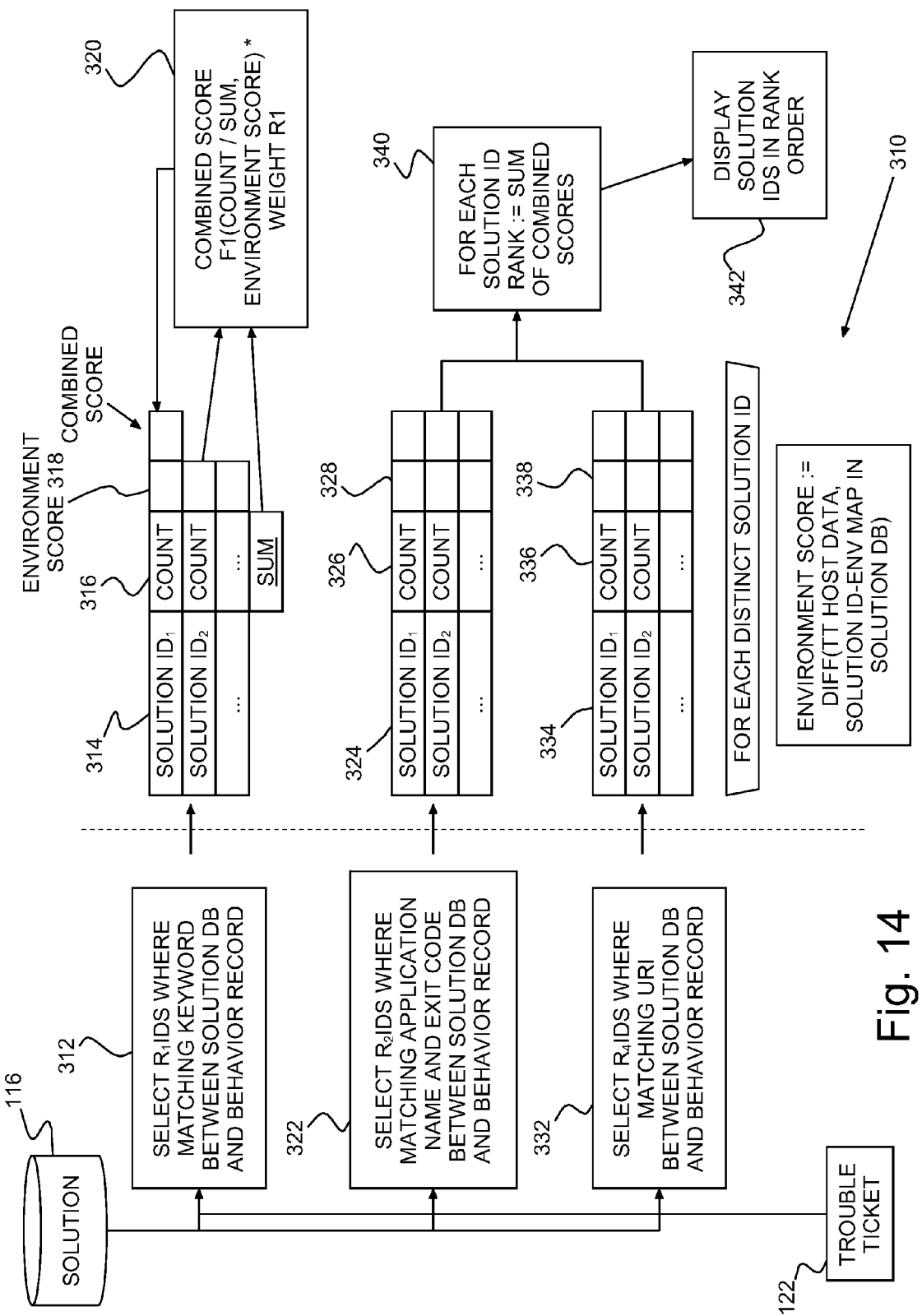

PROACTIVE PROBLEM RESOLUTION SYSTEM, METHOD OF PROACTIVE PROBLEM RESOLUTION AND PROGRAM PRODUCT THEREFOR

BACKGROUND OF THE INVENTION

1. Field of the Invention

The present invention is related to Knowledge Management and more particularly to identifying, tracking and resolving problems reportable to a customer service organization such as a Help Desk.

2. Background Description

Corporations maintain customer service organizations to address customer problems with products to insure customer product satisfaction. Typically, customers are given a number to call or an e-mail address to contact should they have questions or encounter problems with products. The customers' contact is generally known as the Help Desk. A typical Help Desk may receive thousands of product queries daily, often reporting product problems.

However, a customer must contact the help desk before a problem may be reported and one or more Customer Service Representative(s) (CSRs) is/are assigned the responsibility of finding a solution to the particular problem. Frequently, several different customers encounter identical problems. Normally, problem history and corresponding solutions are made available to CSRs, while customers remain unaware of whether a problem is a commonplace. So, customer/users can waste precious time and resources trying to resolve problems; even problems with which the CSRs are well acquainted and may even have solutions readily available. Consequently, system productivity is reduced by users searching for solutions to such well-known system problems.

Moreover, once a customer/user does decide to seek help from the help desk, the help desk generates what is known as a "trouble ticket" for the problem. In generating a trouble ticket, the user may provide a vague problem description, that makes it difficult to extract problem details and to decide which problems are more easily solved by a domain expert. Consequently, manually creating trouble tickets may be a frustrating experience where help desk personnel collect spotty information, and under pressure to reduce length of each help desk call. Unfortunately, this frequently prolongs help desk turn-around time by requiring multiple exchanges between customers/users and support staff to fully exchange problem data to flesh out the problem and, eventually to generate a trouble ticket. Further for newer, less encountered problems, unless every CSR is aware of prior solutions, the customer/user is likely to encounter a CSR that has to learn or rediscover the same previously used solution. While help desk software simplifies handling trouble tickets, it does little to facilitate the generating new trouble tickets and resolving the related problems.

Thus, there is a need for reducing time spent solving known system and application problems and, thereby, increasing user productivity by reducing the time to problem diagnosis.

SUMMARY OF THE INVENTION

It is a purpose of the invention to improve customer support;

It is another purpose of the invention to reduce time wasted searching for problem solutions;

It is yet another purpose of the invention to detect when customers/users are wasting time solving problems for which there is a known fix;

It is yet another purpose of the invention to proactively assemble collateral information needed by a support analyst for diagnostic purposes in solving product problems;

It is yet another purpose of the invention to proactively initiate contact with support staff, selecting the best medium for a given problem, customer/user, and in consideration of any known fixes;

It is yet another purpose of the invention to share proactively collected problem data with help desk personnel to speed up problem determination and resolution.

The present invention is related to a proactive problem resolution system, method of proactive problem resolution and program product therefor. User sensors extract data from user interaction with a computer terminal and pass extracted data to a sniffer agent. The sniffer agent checks for an indication of a user problem by comparing user behavior data against behavior data from previously encountered problems. When the sniffer finds a match, the computer terminal user may be asked if assistance is needed or the user may be automatically referred to the help desk. If a solution already exists for a problem that corresponds to the user behavior, that solution(s) is(are) presented at the computer terminal. Computer terminal users automatically receive problem support, even before it would otherwise be requested.

BRIEF DESCRIPTION OF THE DRAWINGS

The foregoing and other objects, aspects and advantages will be better understood from the following detailed description of a preferred embodiment of the invention with reference to the drawings, in which:

FIG. 14 shows a flow diagram example of identifying a solution based on intercepted behavior from a trouble ticket.

DESCRIPTION OF PREFERRED EMBODIMENTS

Figure 1:
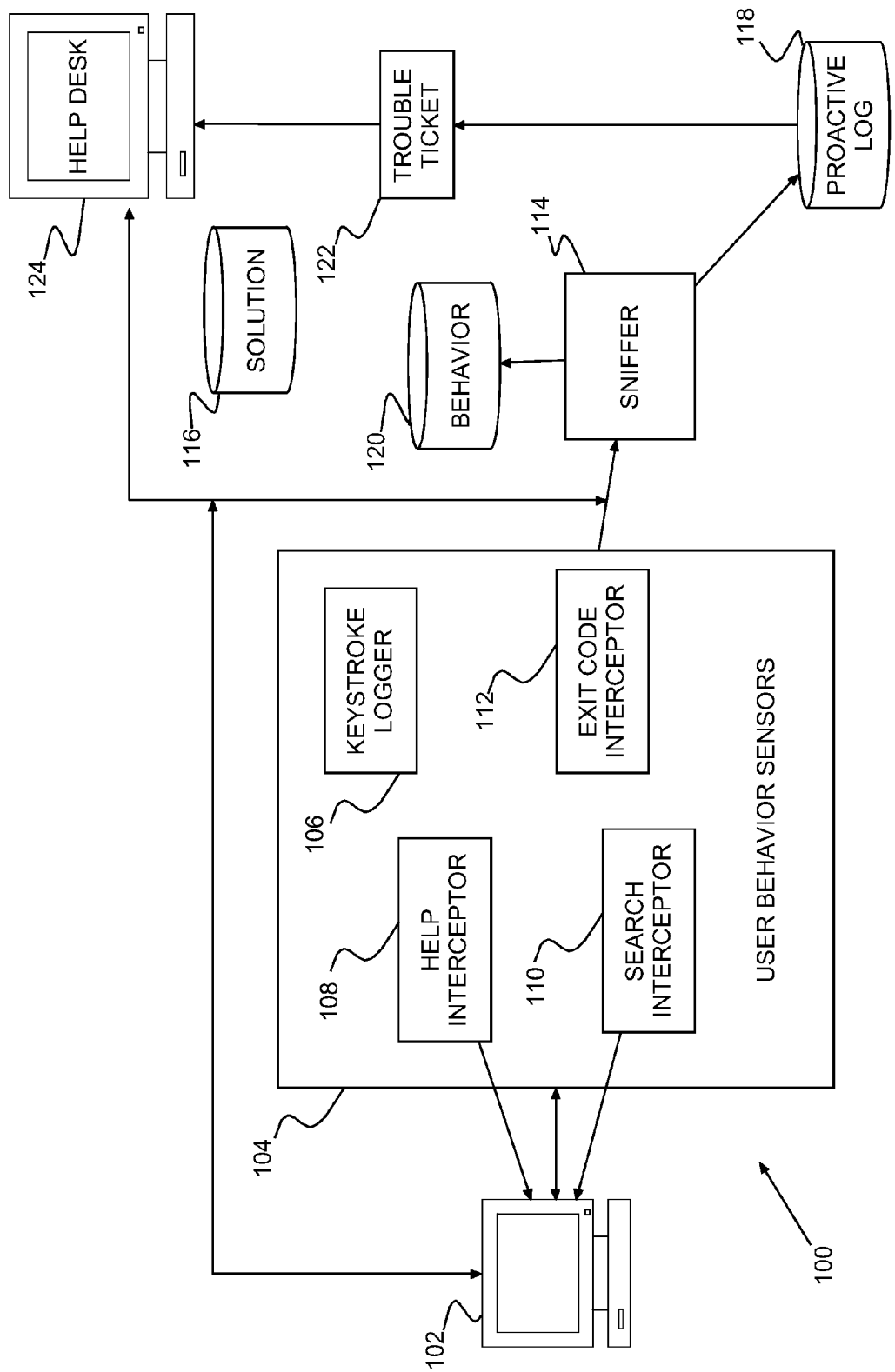
FIG. 1 shows an example of a proactive help for proactive problem solving according a preferred embodiment of the present invention.

Turning now to the drawings, and more particularly, FIG. 1 shows an example of a proactive help desk 100 for pro-active problem resolution according a preferred embodiment of the present invention. The proactive help desk 100 monitors system user activity, e.g., at terminal 102, for indications of user problems (i.e., characterized by atypical user activity) and automatically offers help without waiting for users to request help. Thus, a preferred embodiment proactive help desk 100 includes user behavior sensors 104 to monitor terminal 102 for user atypical activity or behavior, that is indicative that the user needs help. Suitable user behavior sensors 104 may include, for example, a keystroke logger 106, a help function interceptor 108, an Internet search interceptor 110 and a program exit code interceptor 112. Data collected by the user behavior sensors 104 are passed to a sniffer agent 114. Preferably, the sniffer agent 114 maintains a solution database 116, a proactive log 118 and a behavior database 120. It should be noted that user and customer or client are used interchangeably herein to indicate a product customer/user, unless indicated otherwise.

The solution database 116 contains a collection of previously encountered help desk software problems and corresponding solutions. The sniffer agent 114 uses information temporarily stored in the proactive log 118 to monitor active query progress and user behavior in general. The behavior database 120 contains previously identified atypical user behavior patterns that were indicative of a user problem. The sniffer agent 114 matches ongoing user behavior (from user behavior sensors 104) with similar behavior for a particular problem in the behavior database 120 and any corresponding solution in the solution database 116, and proactively presents the user with an opportunity to request help, e.g., in a user help window (e.g., in a web browser window) to the user at terminal 102. The sniffer agent 114 also generates trouble tickets 122 from the proactive log 118 for each problem, whether resolved or unresolved. The trouble tickets 122 are forwarded to help desk software 124, e.g., for consideration by a Customer Service Representative (CSR).

So, according to a preferred embodiment of the present invention, the sniffer agent 114 uses sensor information from the user behavior sensors 104 to monitor activity at terminals 102. The sniffer agent 114 determines when a particular user has encountered a problem and has begun problem determination, that may be characterized by atypical behavior or unknown problems, e.g., by a user searching for help. The terminal 102 may be any suitable network interface providing access to system users that may encounter problems and require support, such as, for example, a workstation, a personal computer (PC) running a graphical user interface (GUI), a wireless unit with Internet access (e.g., wi-fi or a cell phone web browser) or, any other suitable appliance. Normally, the user behavior sensors 104 and a sniffer agent 114 are located locally to the user, e.g., at terminal 102.

Atypical user behavior may be identified from user interaction, for example, by keyword searches in a typical web search engine, by using a diagnostic application or by other web usage. Typical web search engines include, for example, Google™ or Yahoo!®. Microsoft Windows® Help from Microsoft Corporation is an example of a typical diagnostic application. The sniffer agent 114 sniffs this interaction and parsed into terms that are compared against keywords for previously identified problems. The sniffer agent 114 proactively collects user behavior data from the user sensor agents 108, 110, 112, 114, such as troubleshooting information. The sniffer agent 114 compiles and stores the collected information in a trouble ticket 122, and analyzes the user behavior information to initiate and facilitate help desk support. Also, the sniffer agent 114 uses the behavior analysis to determine whether any previously resolved problem matches the current user problem; and, whether a solution was found for that prior problem to facilitate initiating proper help desk support requests. Support requests are routed appropriate to Information Technology (IT) support staff based on problem signature support request. Previous problem fixes are compiled and stored in the solution database 116 for sharing with the user community based on the number of matching actions.

Figure 2A:
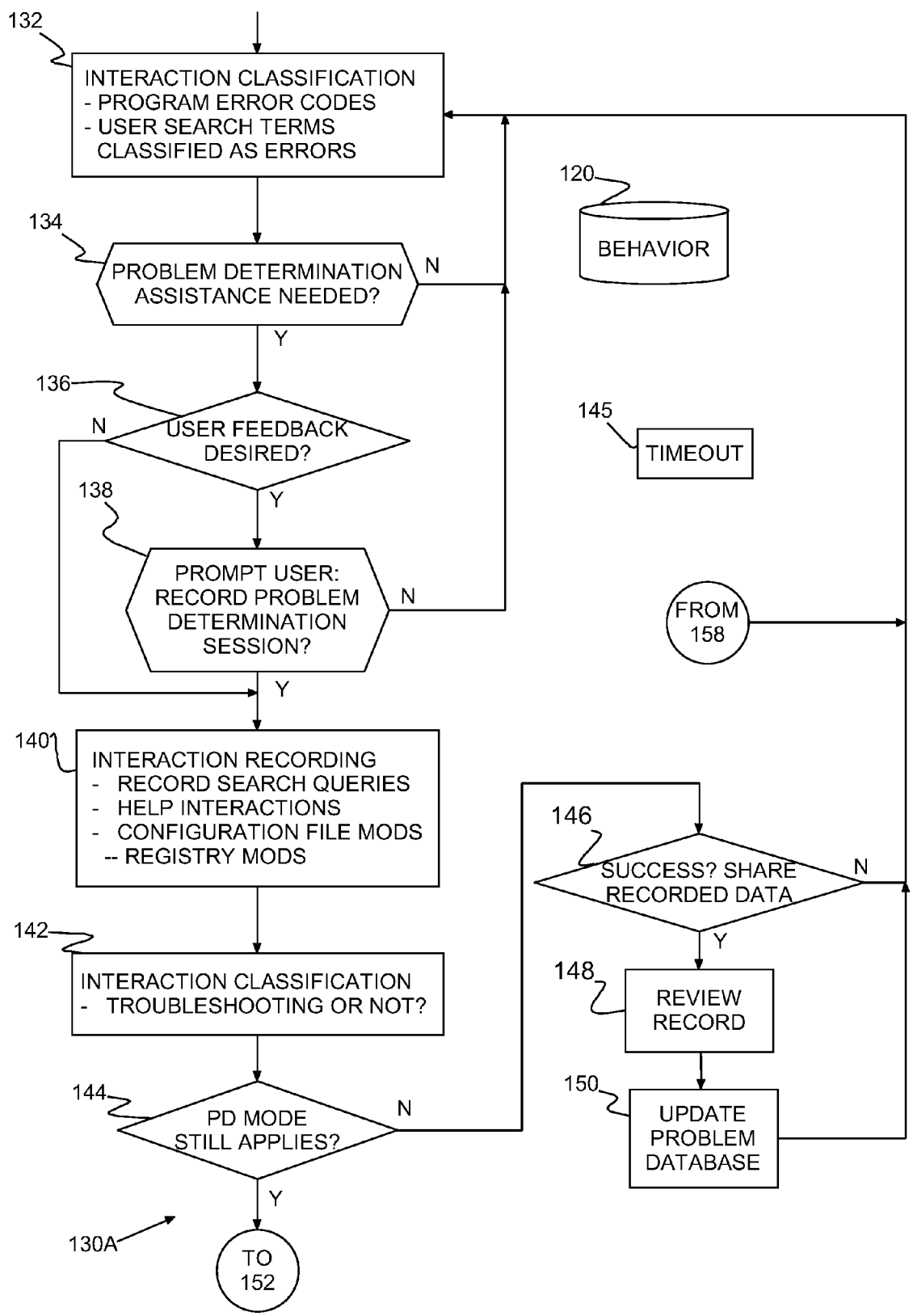
FIGS. 2A-B show an example of problem detection from user behavior for the proactive help desk.
Figure 2B:
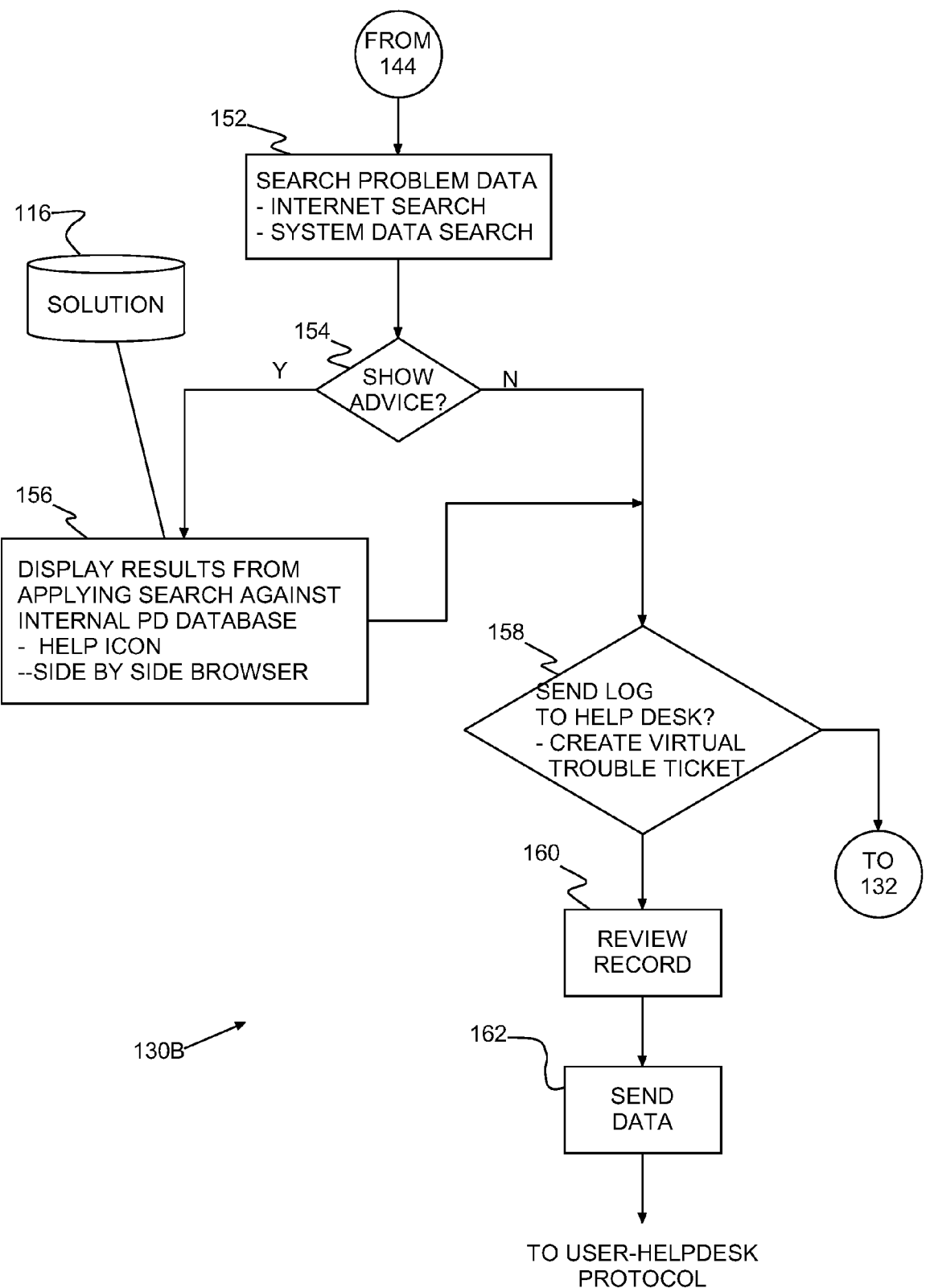

FIGS. 2A-B show an example of problem detection from user behavior 130A-B for the proactive help desk 100 of FIG. 1. The user behavior sensors (104 in FIG. 1) sample terminal inputs including performing, for example, packet sniffing, http proxy monitoring, dynamic link library (dll) redirection, system call interception and program output sampling. The user behavior sensors 104 collect, for example, environment variables, error codes returned by processes, logs (e.g., Windows® event log), WMI, reboots, and Tivoli agents. The user behavior sensors 104 use intercepts via ptrace or transparent web proxy to monitor user web site browsing patterns, track the user logging into any pages retrieved that contain error messages and keywords that are entered into search engines (e.g., Google™). For example, typical words scanned for may include: problem, crash, hang, Linux, failure, and failed. The user behavior sensors 104 also collect information regarding any use of the help function including entered keywords.

The sampling results are temporarily stored in the proactive log (118 in FIG. 1). In step 132 the sniffer agent 106 performs interaction classification to identify indications of user problems, such as, encountering program error codes and using search terms that are classified as indicating the user has encountered errors. Then in step 134, a determination is made whether the interaction classification results indicate that problem determination assistance is necessary, e.g., an error was encountered. If not then, returning to step 132, the next incoming sample is placed in the proactive log. Otherwise, if in step 134 it is determined that user assistance may be necessary, then, in step 136 a determination is made of whether user feedback may be necessary or desired. If so, in step 138 the user is prompted as to whether the user is encountering a problem and so, a problem determination session should be recorded. If the user responds by indicating that a problem has not been encountered, then returning to step 132, the next incoming sample is placed in the proactive log. Otherwise, if the user indicates that a problem has been encountered in step 138 or, if it is determined in step 136 that user feedback is unnecessary, then the help desk enters problem determination (PD) mode in step 140 and begins interaction recording.

In interaction recording step 140, session activity is recorded collecting, for example, search queries, help interactions, configuration file modifications and registry modifications. Next, in step 142 the recorded interaction information is classified as to whether it is troubleshooting, i.e., indicates the user is experiencing a problem. In step 144 a determination is made whether the help desk is still in problem determination mode for the current matter, e.g., a timeout 145 has occurred for the current problem. If problem determination mode does not apply, then in step 146 the result is checked to determine whether the problem was successfully resolved, and if so, the recorded data is shared. If the problem was resolved in step 146, then in step 148 the problem and result are reviewed and in step 150 the solution database is updated. After updating the solution database or, if in step 146 the problem was not successfully resolved, then retuning to step 132, more user input data is collected.

If in step 144, however, problem determination mode still applies, then in step 152, problem data is searched for similar problems. For example, the Internet may be searched for similar problems or a system data search may be used. In step 154, a determination is made of whether the search should be presented to the user; and if so, in step 156, the search results are displayed and the results are added to the solution database 116. The results may be displayed, for example, by providing the problem side by side with the solution, e.g., in browser at the terminal 102 of FIG. 1. Also, at the same time, the user may be offered additional help, e.g., including a help button icon with the results. In step 154 if it is determined not to show advice or, subsequent to displaying the results to the user in step 156, a determination is made of whether to create a virtual trouble ticket in step 158, or if a virtual trouble ticket is premature. If a virtual trouble ticket is not created, then retuning to step 132, more user input data is collected. Otherwise, in step 160 the problem data is reviewed and in step 162 forwarded the help desk.

Figure 3:
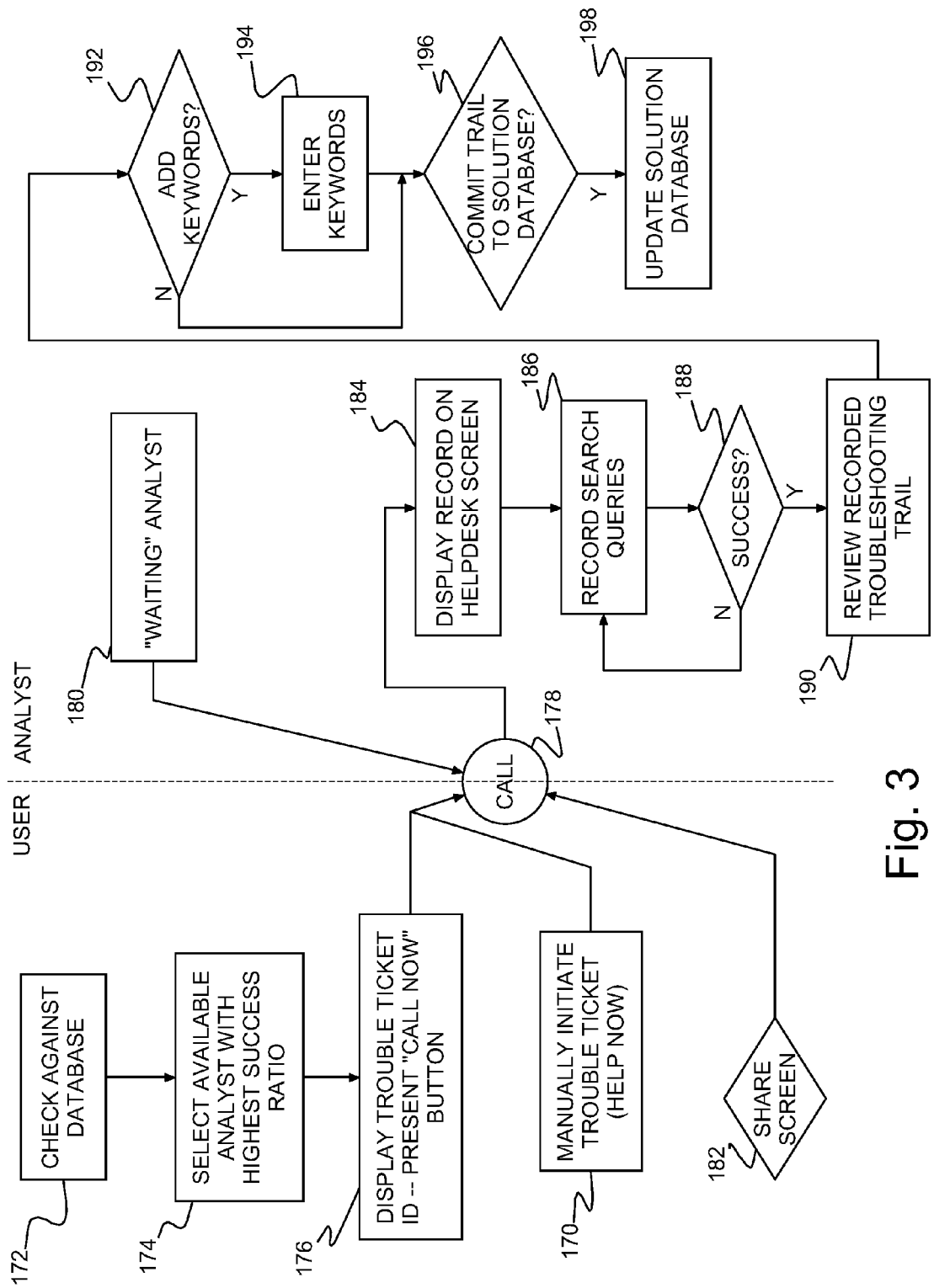
FIG. 3 shows an example of user interaction with a help desk analyst in analyzing a problem identified in a trouble ticket.

FIG. 3 shows an example of user interaction with a help desk analyst in analyzing a problem identified in a trouble ticket. In step 170, the user can manually initiate a trouble ticket, e.g. pressing a "Help Now" icon in a browser or a help window at the terminal 102 or, the user may be presented with "need assistance dialog." Alternately, in step 172 the user can check the trouble ticket against problems in the solution database 116, which may include analyst success rates for particular types of problems. So, for example, the user may be presented with search results from an internal problem determination (PD) database alongside a "Google etc." query. Then, in step 174 the user can select an analyst from available analysts, e.g., the one with the highest success ratio for the user's type problem. In step 176 the user prints the trouble ticket ID and the user may be presented with a "Call Now" button in the help window. In step 178 the user may select the "Call Now" button; or a need assistance dialog may be created based on selected contact preferences for the analyst (e.g., email or instant messaging), analyst availability, and severity score. Preferably, logged data is transmitted before initiating contact with a contact method chosen by user. Then, in step 180 the available analyst joins the call; and, in step 182 the analyst and the user share the help window. In step 184, the analyst displays the trouble ticket record and in step 186 begins iteratively entering and recording search queries for the problem. The analyst continues entering queries until in step 188 the problem has been solved. Next in step 190, the analyst reviews the troubleshooting trail, e.g., to identify redundancies or unnecessary steps. In step 192 the analyst checks whether relevant keywords can be added to the record and, if any are found, in step 194 the analyst adds the new keywords. After adding new keywords, in step 196 the analyst decides whether to commit the troubleshooting trail to the solution database 116. In step 198, the solution database 116 is updated.

Figure 4:
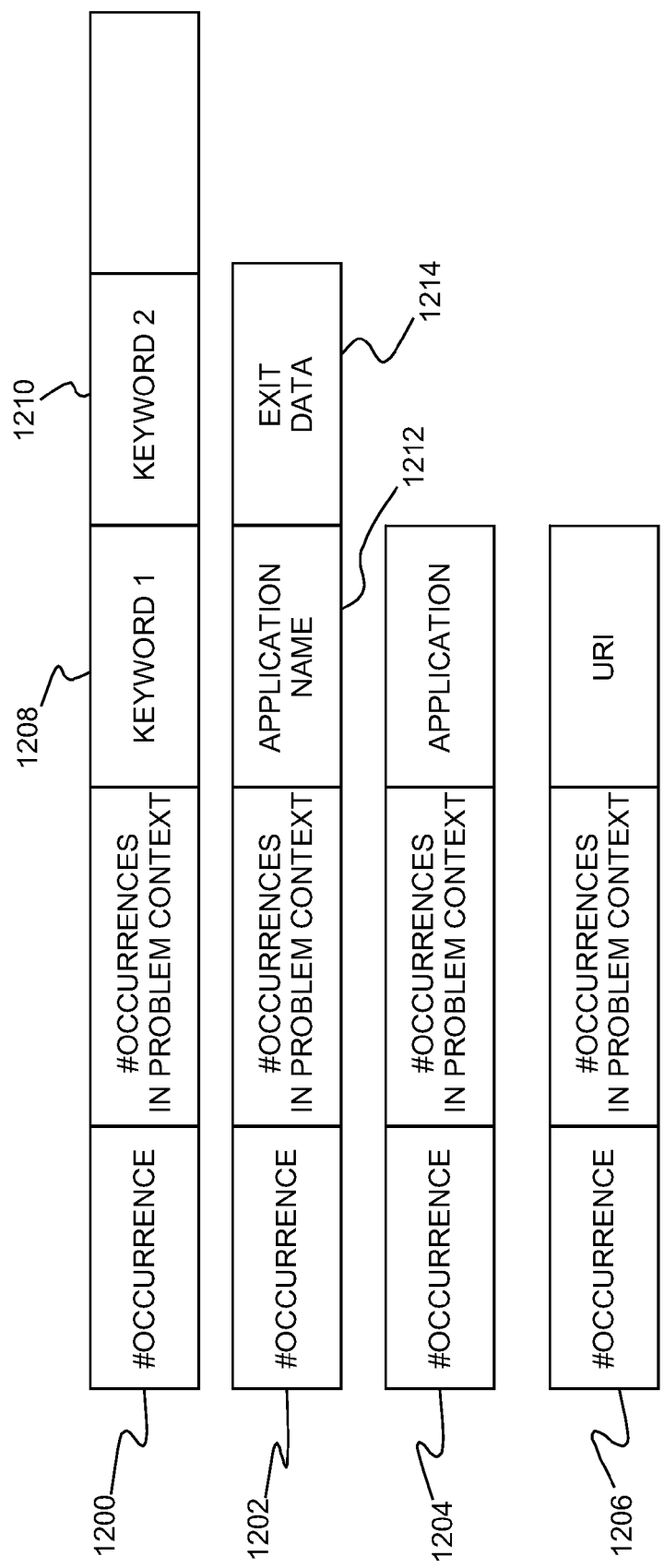
FIG. 4 shows an example of the structure of behavior records in the behavior database.

FIG. 4 shows an example of the structure of a behavior record in the behavior database 120. Each behavior record is a four dimensional list (set) or relation 1200, 1202, 1204, and 1206 that is created during problem determination over a given period of time, $T_1$, $T_2$. For each problem, all occurrences of keywords, exit codes, uniform resource identifiers (URIs), for example, are counted. Also, each time a session is classified as a troubleshooting session by either the user or the help desk, the record is counted as an occurrence in a problem context. The four relations include: a set of keyword search terms or search term relation 1200; a set of exit code exceptions that were generated or exit code relation 1202; a set of applications that were launched or application relation 1204; and, a set of URIs visited or URI relation 1206. Each relation 1200, 1202, 1204, and 1206 may include multiple entries as well as between the timestamps, and during times that the troubleshooting took place.

The search terms in the first relation 1200 are intercepted by interposing on systems calls, help software input dialogs, direct entry into universal help providers and terms extracted from web search queries. The first relation 1200 includes keywords 1208, 1210, sorted in some stable order, e.g., lexigraphically. The second relation 1202 represents a program exit code interception with related data from system logs and system call interception. So, the second relation 1202 includes the name of an application 1212 and related exit data 1214 for that application 1212. The third relation 1204 includes program launch data for other programs running at the time of the problem. The program launch data may include, for example, the system log, results from a contemporaneous scan of the running applications and system call information from the programs running at the time of the problem. The fourth relation 1206 lists the URIs that were visited during the troubleshooting timeframe.

Figure 5:
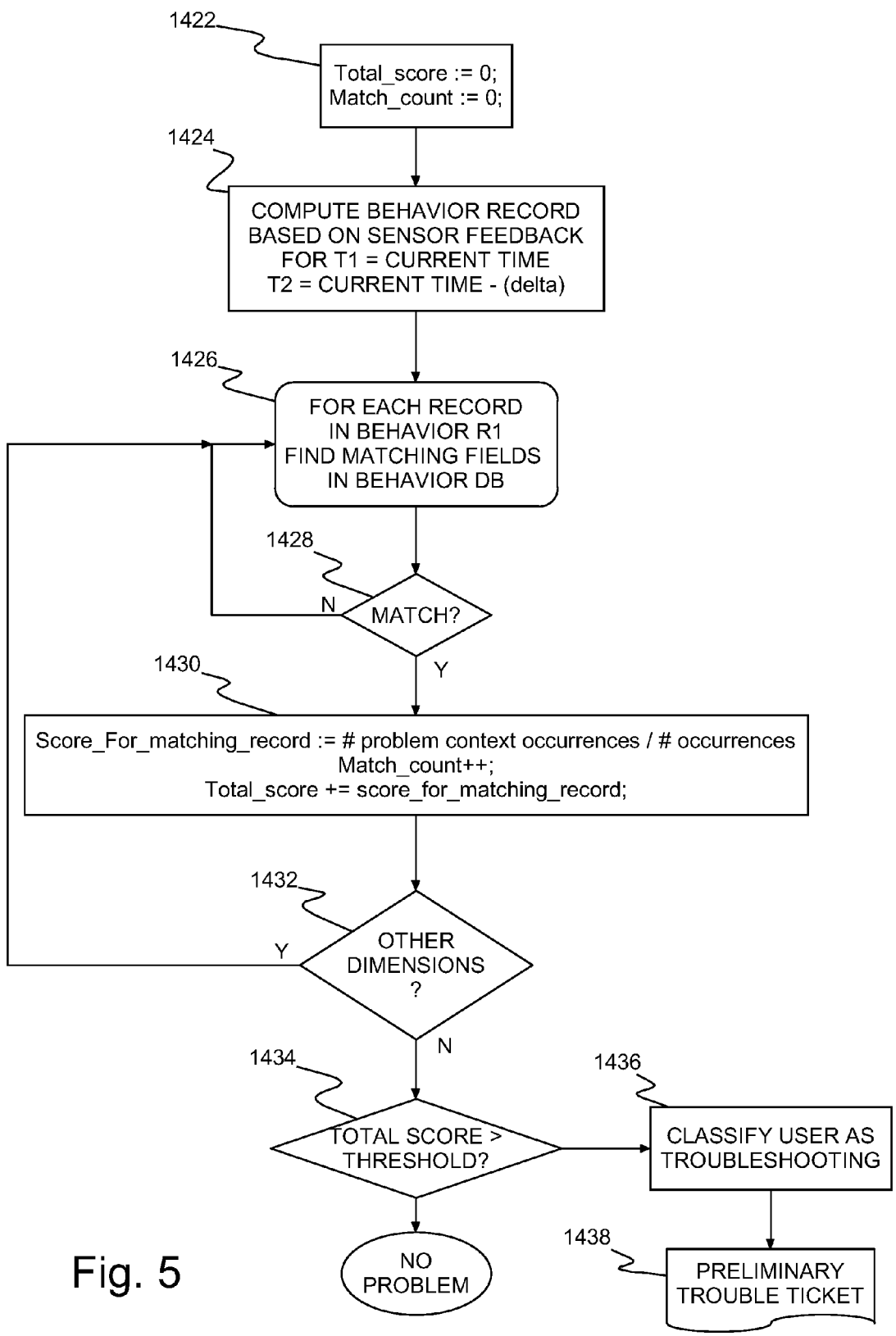
FIG. 5 shows an example matching behavior against records in the behavior database to determine whether the user is troubleshooting a problem.

FIG. 5 shows an example of matching behavior against records in the behavior database in step 142 of FIG. 2 to determine whether the user is experiencing a problem. In step 1422 comparison variables including a total score and match count are initialized to zero. In step 1424 a behavior record is generated from sensor feedback over the problem determination period, $T_1$ to $T_2$. Next, in step 1426 the records are iteratively checked field by field in a single behavior record relation against that relation for records in the behavior database, until in step 1428 a match is found. In step 1430 each match is assigned a score based on the ratio of the number of occurrences within the problem context to the number of match occurrences. The resulting total score indicates whether a matching record was found. If other relations remain to be checked 1432, then returning to step 1426 the remaining records are iteratively checked, field by field in another behavior record relation until all relations have been checked. Once all records have been checked in all relations 1432 the behavior records are processed, beginning in step 1434 as the total score of the behavior record is compared against a problem threshold. If the score does not exceed the problem threshold then the behavior is deemed not presenting a problem. Otherwise, in step 1436 the user behavior is classified as troubleshooting a problem and, a preliminary trouble ticket 1438 is created.

Figure 6:
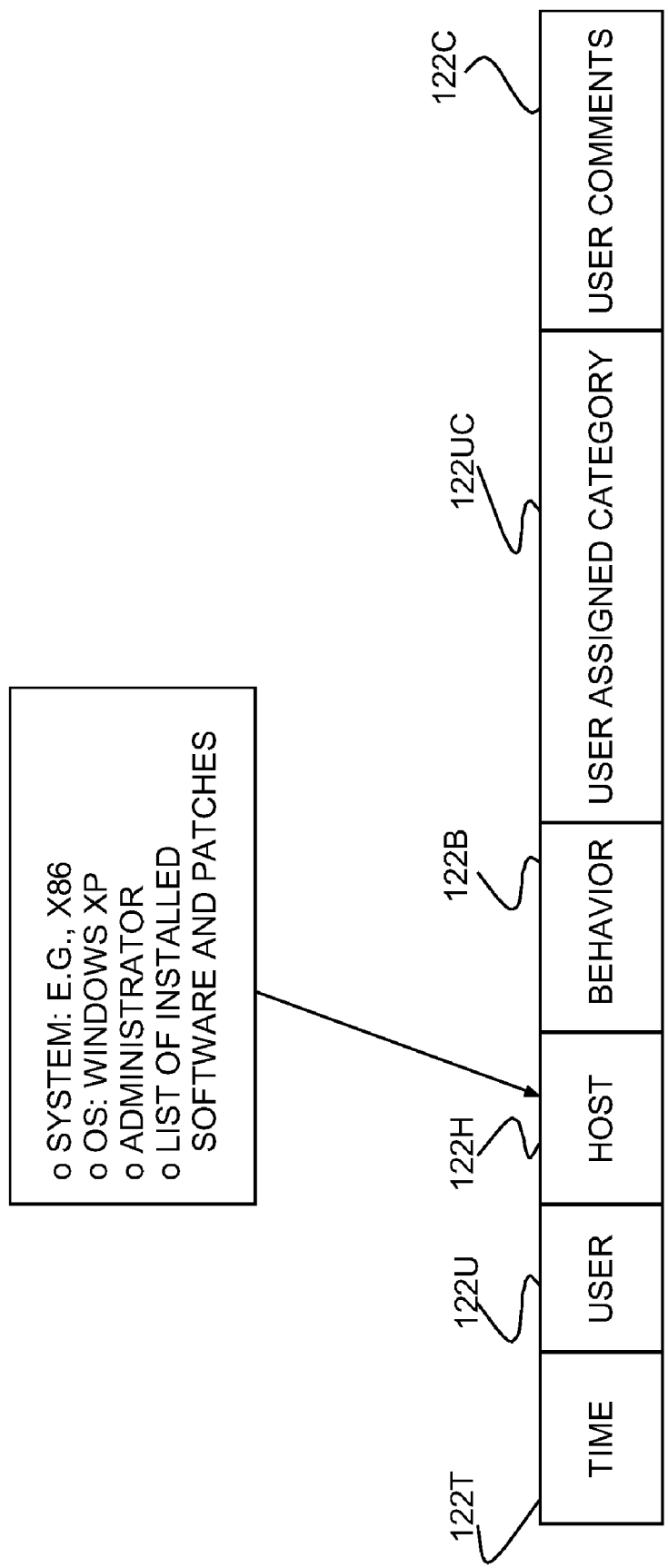
FIG. 6 shows an example of a trouble ticket.

FIG. 6 shows an example of a trouble ticket 122. Preferably, a trouble ticket 122 includes at least, a time field 122T that indicates the time that the ticket was created, a host field 122H, and a behavior field 122B. Also, the trouble ticket 122 may include a user field 122U, a user assigned category field 122C and a field 122UC for user comments. The host field 122H, for example, may include system specific information such as, operating system, a system administrator, a list of the installed software and any installed software patches.

Figure 7A:
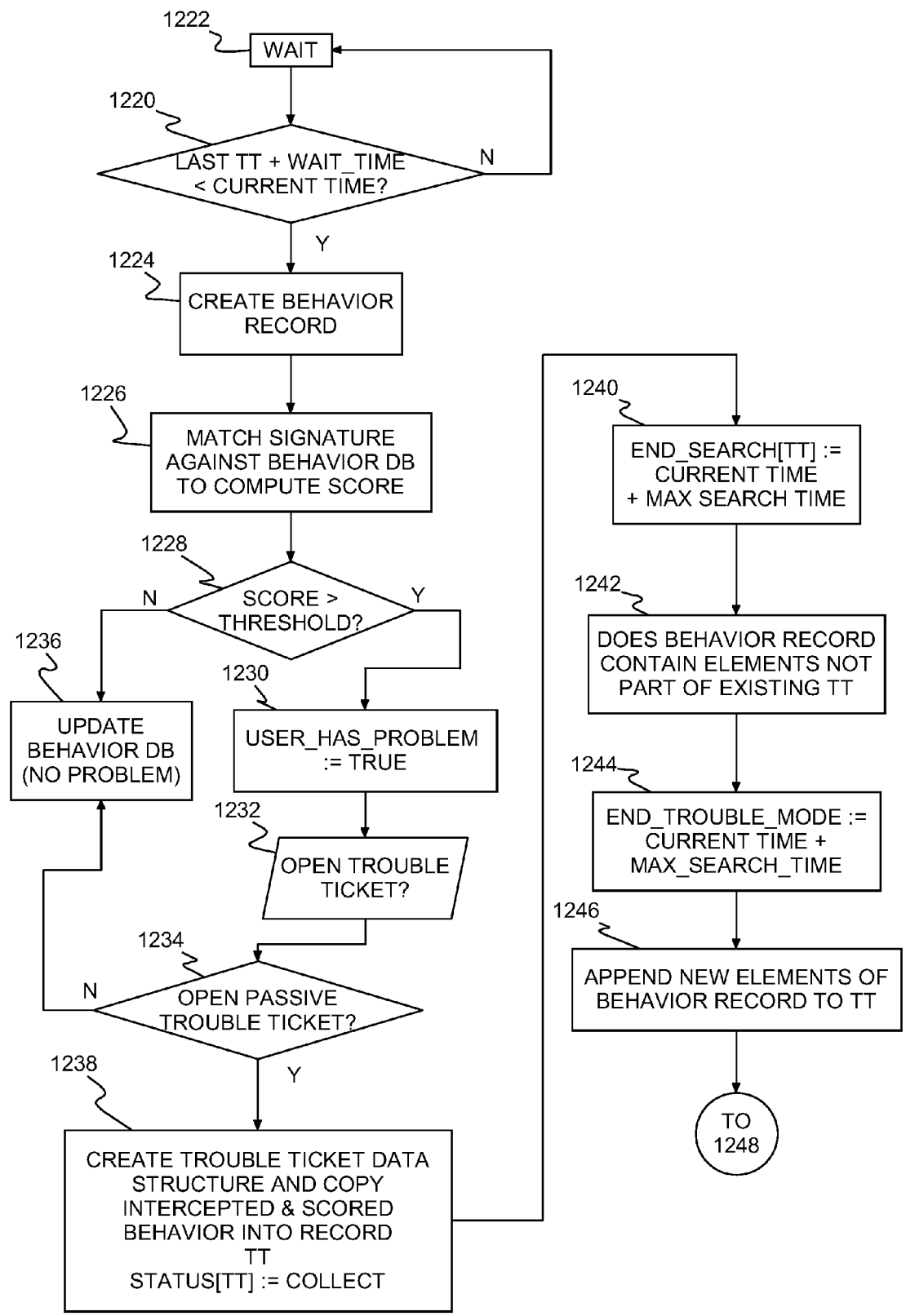
FIGS. 7A-B show an example of creating trouble tickets.
Figure 7B:
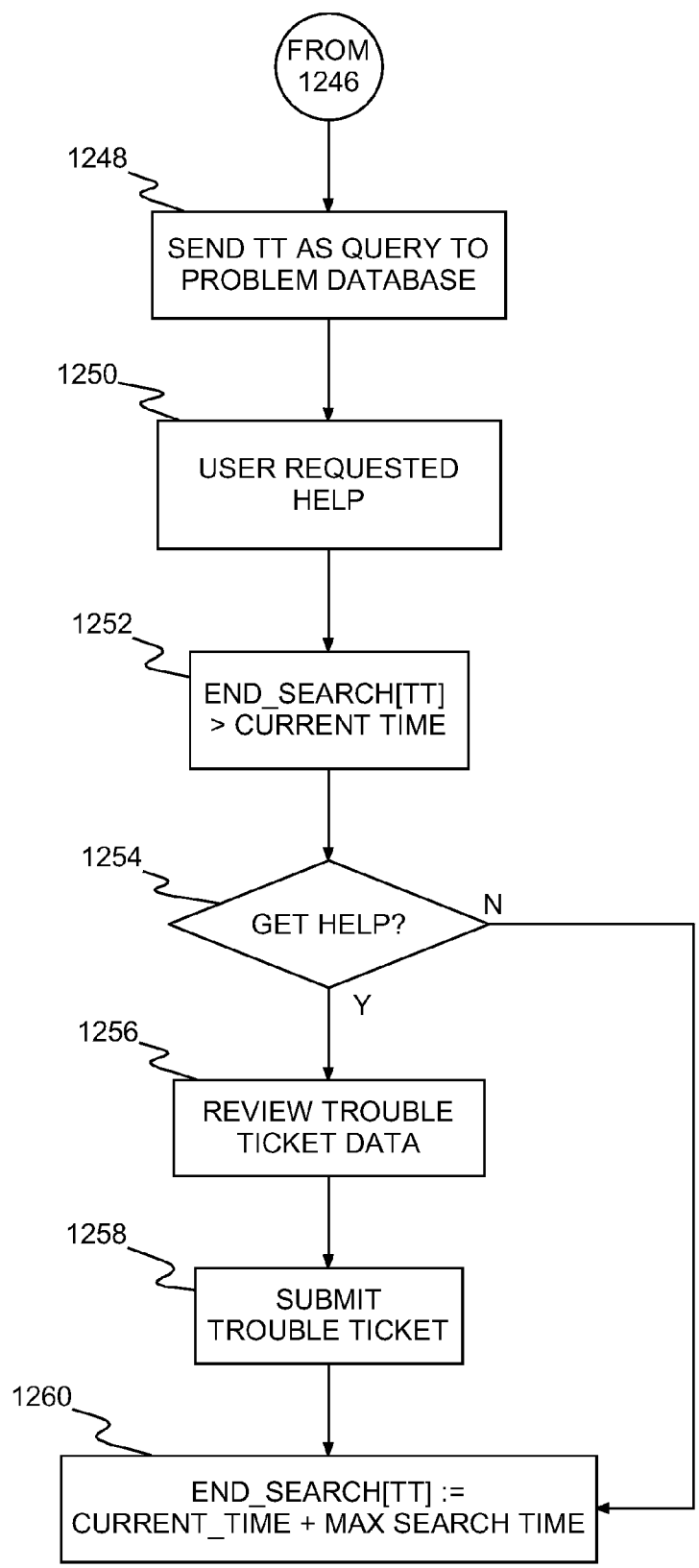

FIGS. 7A-B show an example of creating trouble tickets 122. In step 1220 current time is checked to determine whether sufficient time has elapsed since creating the last trouble ticket. If not in step 1222, then additional time is given to find a match. Otherwise in step 1224, a behavior record is created. In step 1226 the new behavior record is checked against behavior records in the behavior record database 120 to compute a score for the new behavior record. In step 1228 the score is checked to determine whether it exceeds a selected threshold. If the score exceeds the threshold, then step 1230 a binary variable indicating that the user has a problem is set to true. In step 1232 the user is allowed to open a trouble ticket. If the user does not open a trouble ticket, then in step 1234, the behavior record is checked to determine whether a problem is indicated and, if not, in step 1234 the behavior data base is updated to indicate that no problem was detected. Otherwise, in step 1236 the help desk opens a trouble ticket. In step 1238 the trouble ticket data structure is created for the behavior record and the intercepted behavior and corresponding score is copied into the appropriate field, i.e., 122B in FIG. 6. Then, in step 1240 the search end time is determined at some future time (i.e., the maximum search time) beyond the current time. Since a trouble ticket was opened, either at the user's initiation in step 1232 or, passively by the help desk, in step 1242 the behavior record is checked to determine whether it contains elements that are not part of an existing trouble ticket, i.e., whether the problem matches other open tickets. In step 1244 the time of the end of the search is determined. In step 1246 any identified new behavior elements are added to the trouble ticket behavior field 122B. In step 1248 the trouble ticket is sent as a query to the problem database. In step 1250 a determination is made whether the user has requested help. If not, then in step 1252 the potential problem is evaluated to determine whether it has been active for longer than a selected maximum search time. Once that maximum search time has been exceeded the trouble ticket is closed automatically and, in step 1254 a determination is made whether to additional help is needed, e.g., the user is prompted whether he/she would like help. If help is needed, then in step 1256 the trouble ticket data is reviewed and, submitted in step 1258. If in step 1254 help was deemed unnecessary/refused, then the search ends in step 1260 at the end of the search time.

Figure 8:
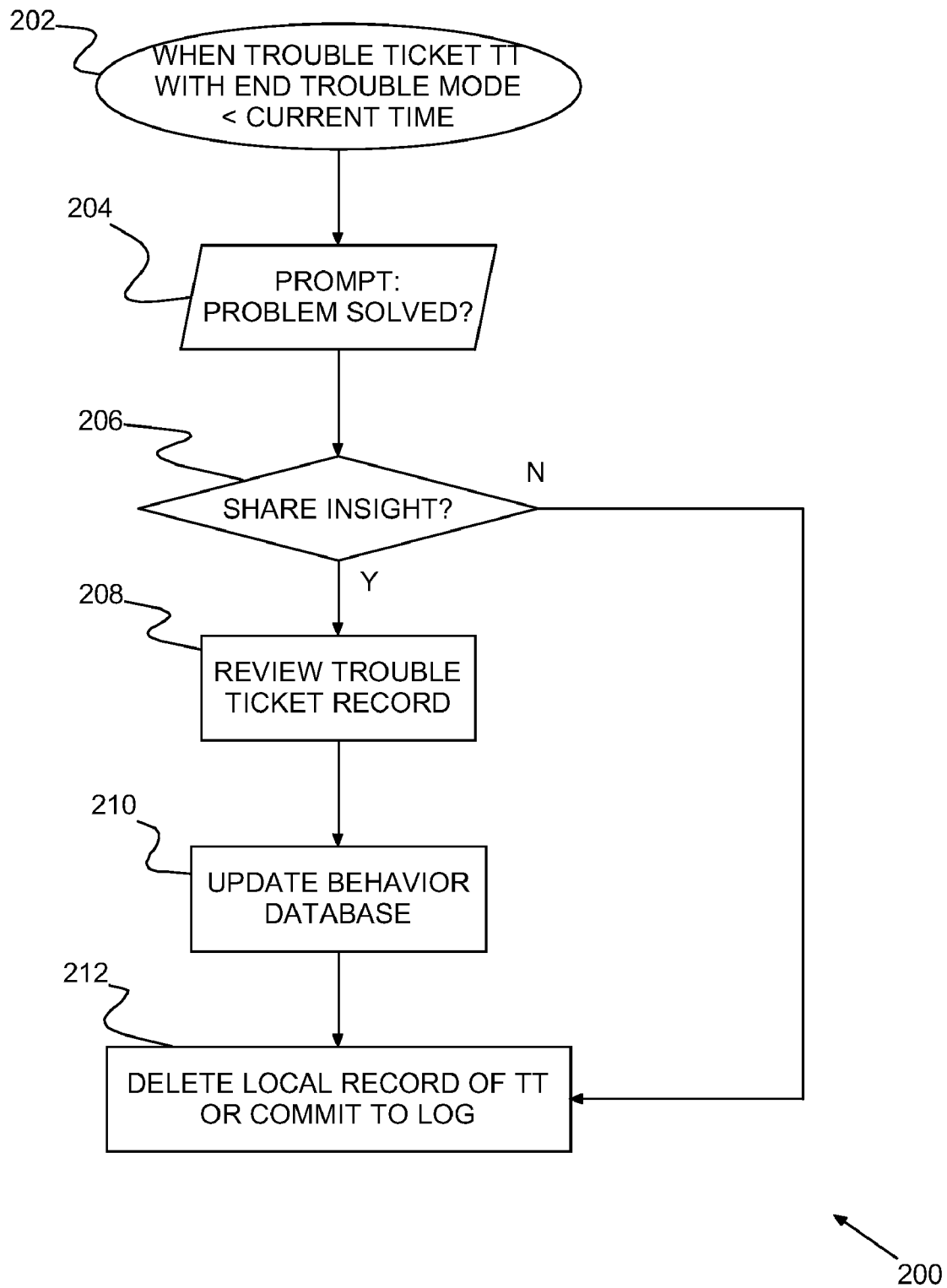
FIG. 8 shows an example of a trouble ticket time out procedure, that occurs when the time for processing a trouble ticket expires.

FIG. 8 shows an example of a trouble ticket time out procedure 200, which occurs in step 202 when the time for processing a trouble ticket expires. In step 204 the user is prompted as to whether the problem has been solved. If the problem remains unsolved, then normal state of the art help desk/trouble resolution approaches may be applied to the unresolved problem. Otherwise, if the problem has been solved, then in step 206 user feedback is solicited. If the user provides any feedback/insight, then in step 208 the trouble ticket is reviewed and in step 210 the behavior database is updated based on the user feedback. After updating the behavior database or if the user declines to provide additional insight in step 206; then, in step 212 the local trouble ticket record is deleted and/or the information is committed to the proactive log, i.e., 118 in FIG. 1.

Figure 9:
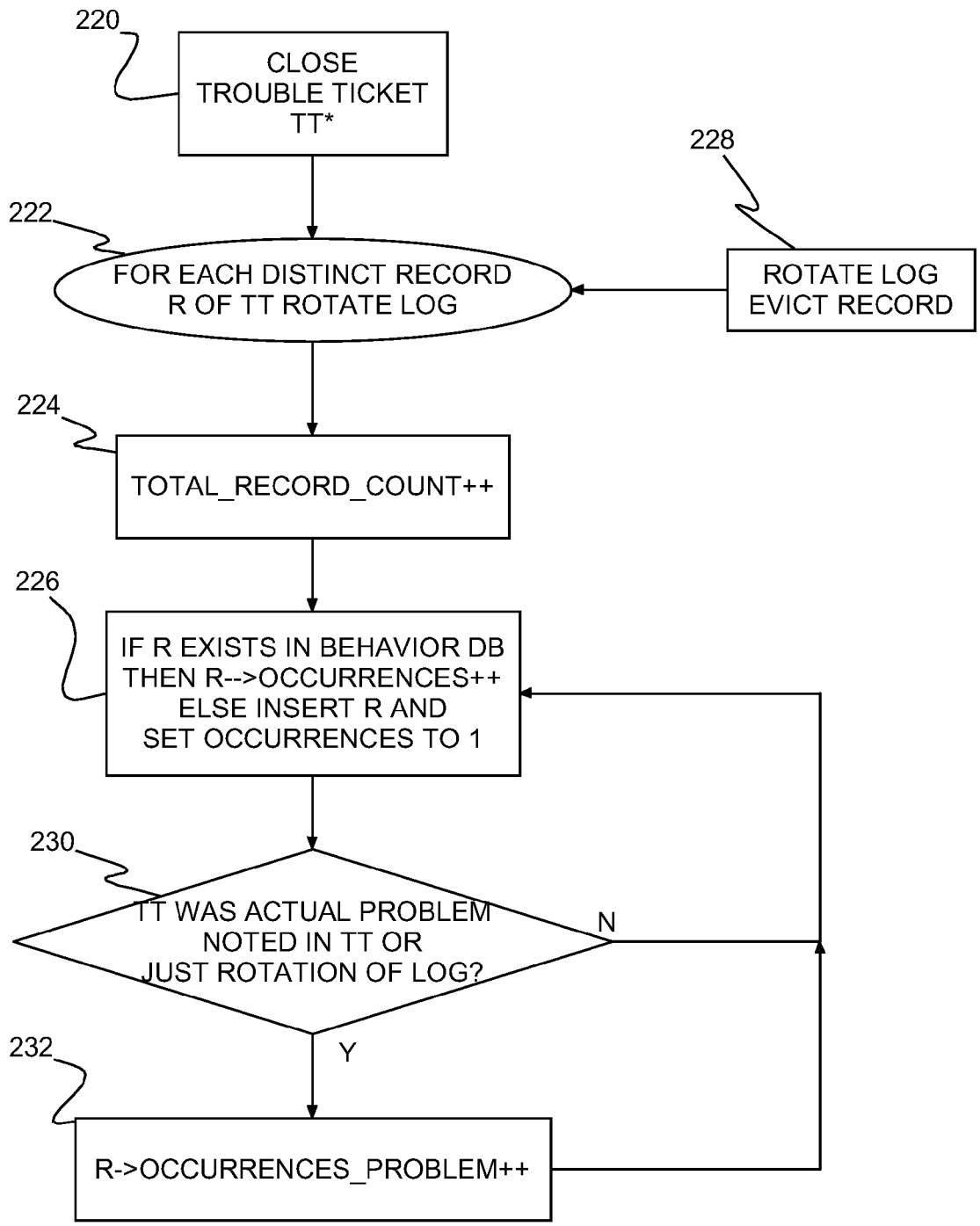
FIG. 9 shows an example of updating the behavior database after finding a solution or upon an indication that there is no problem.

FIG. 9 shows an example of updating the behavior database 120 after finding a solution or if, at any time, the user indicates that there is no problem. In step 220 the trouble ticket is closed and in step 222 each distinct trouble ticket record is selected and in step 224 the total record count is incremented. In step 226 if the behavior in the selected trouble ticket is found in the database, the number of occurrences for that behavior is incremented. Otherwise, if it is the first occurrence, the count is set to one. In step 228, the next distinct trouble ticket record is selected in step 222 and the record count incremented in step 224. After all tickets have been selected in step 230 the trouble ticket is checked to determine if it indicated the actual problem or just a rotation of the proactive log. If the trouble ticket indicated the problem then, in step 232 the corresponding problem count is updated in the behavior database.

Figure 10:
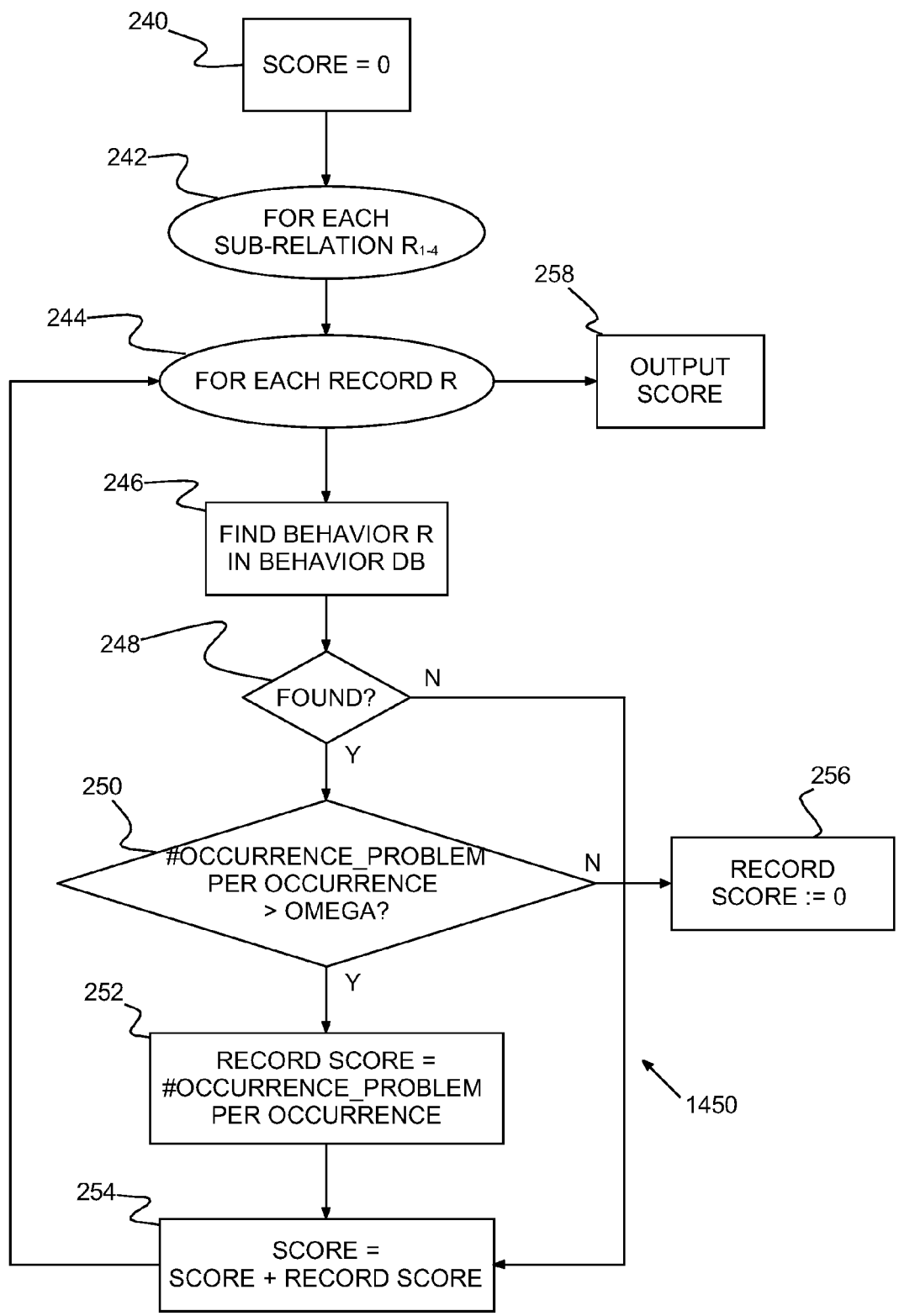
FIG. 10 shows an example of the steps in scoring actual user behavior to determine the trouble ticket scores.

FIG. 10 shows an example of the steps in scoring actual user behavior using global problem determination database to determine the trouble ticket scores e.g., as in step 1450 of FIG. 5, wherein, an action score is computed for the last n proactive log entries in every rotating window. Beginning in step 240 the score is initialized to zero. Then, an individual sub-relation is selected in step 242 and one record is selected for that sub-relation in step 244. In step 246 the behavior database is checked for a match with the behavior in the selected record. In step 248 if that behavior is found in the behavior database, then in step 250 an occurrence ratio is determined for that behavior and checked against a threshold value, ω, which is typically, near one (1). If the behavior is not found in step 248 or the occurrence ratio is below the threshold value, then in step 252, the record score is set to zero. Otherwise in step 254 the record score for that behavior is set to the occurrence ratio. In step 256, the record score is added to the score for the current sub-relation and, returning to step 242 another record is selected for the current sub-relation. Once all records have been selected for the current sub-relation, the score is output in step 258 as the action score and the next sub-relation is selected in step 244 until all sub-relations have been selected. The resulting action scores determine whether or not a user is found in troubleshooting mode. Preferably, the actual behavior is scored only when the user is found in troubleshooting mode.

Browsing behavior may be scored and, a bit vector of keyword hits may be created. Observed system failures may be scored including, for example, abnormal application exits; an Internet Control Message Protocol (ICMP) connection refusals to host a selected site; and results in keyword matches. Both logged user activities and observed system failures are matched against signatures of known problems. So, for example, problems that match both browsing behavior and observed system failures that are likely to be root causes may be assigned a score of 2; and problems that only match one dimension are signed may be assigned a score of 1. A severity score may be assigned that accounts for the time that a user has spent so far in problem determination mode; any application or system affected by problem; and the user identity. These problems are sorted within the same score by occurrence frequency as determined by counting closed trouble tickets. Once sorted, generated trouble tickets are routed to analysts who solved most problems with similar suspected root cause.

Figure 11:
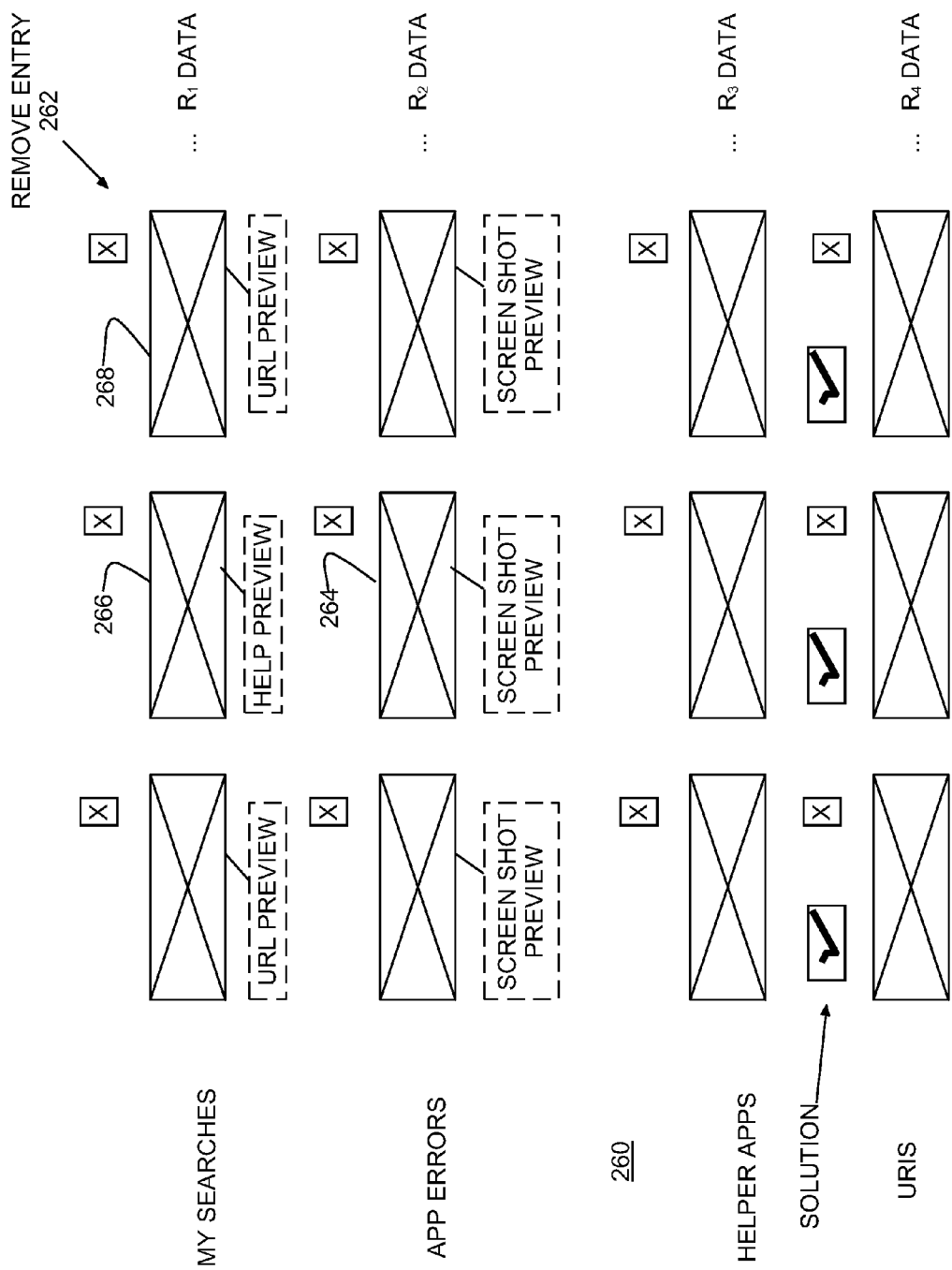
FIG. 11 shows an example of trouble ticket structure for user review.

FIG. 11 shows an example of trouble ticket display 260 for user trouble ticket review, e.g., at terminal 102 of FIG. 1. Preferably, each user is presented with a navigable view of a trouble ticket 260 that can be selectively customized to display only what the particular user desires. The trouble ticket may include previous search history (e.g., MySearches), links to corresponding application errors, available helper applications and a list of solutions. Also for simplicity, for example, features and sub-features may be suppressed/hidden, e.g., by selecting a checkbox 262 to selectively removing entries. Also, the trouble ticket review can be simplified with user annotations, e.g., with screen shots 264, help windows 266 and web pages 268 that may be represented by individual trouble ticket entries. Deleted items are marked (not shown) on the trouble ticket as deleted only and are not considered in updating the solution data base 116. However, the deleted items may be considered in updating the proactive log 118.

Upon closing a trouble ticket, the analyst is prompted to classify the problem that was just solved. Signatures may be presented in hierarchical view. The trouble ticket is interposed on existing trouble ticket solutions (e.g., sniffing window events) to activate classification when analyst indicates the problem is solved. Preferably, this is presented to help desk solution partners through an integrated application programming interface (API).

Figure 12:
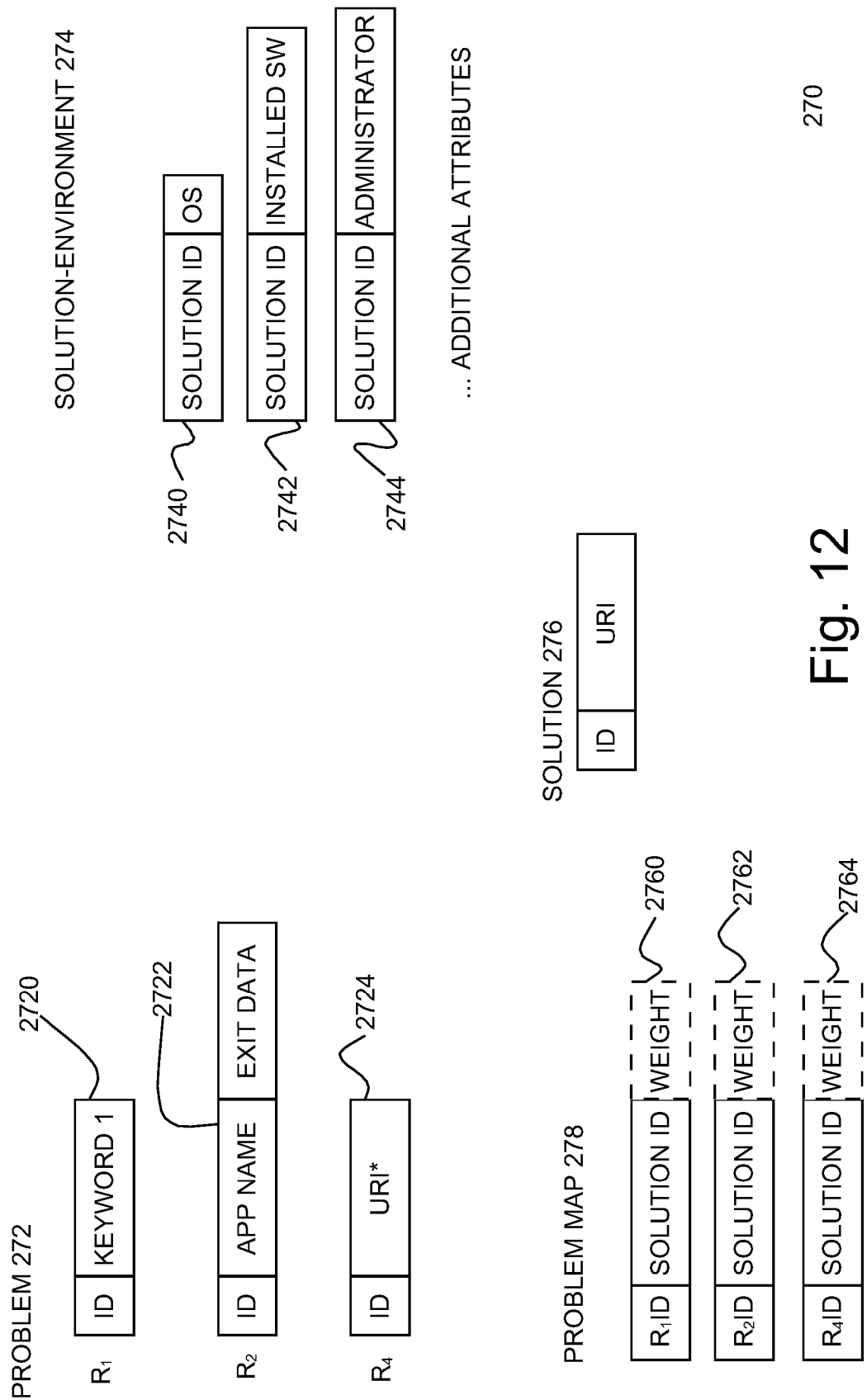
FIG. 12 shows an example of a solutions database structure.

FIG. 12 shows an example of a solutions database structure 270, e.g., records in 116 of FIG. 1. Each problem entry 272 includes a subset of entries including, for example, a keyword subentry 2720, an application subentry 2722 with exit data, and a URI subentry 2724. Preferably, these subentries 2720, 2722, 2724 each correspond to one of the relations in the behavior database entries. A solution environment 274 identifies operating system 2740, installed software 2742 and an administrator 2744 for each solution 276. Each solution 276 is identified with a particular URI indicating the location of the solution. A problem map 278 lists previously identified solutions 2780, 2782, 2784 and a weight associated each.

Figure 13A:
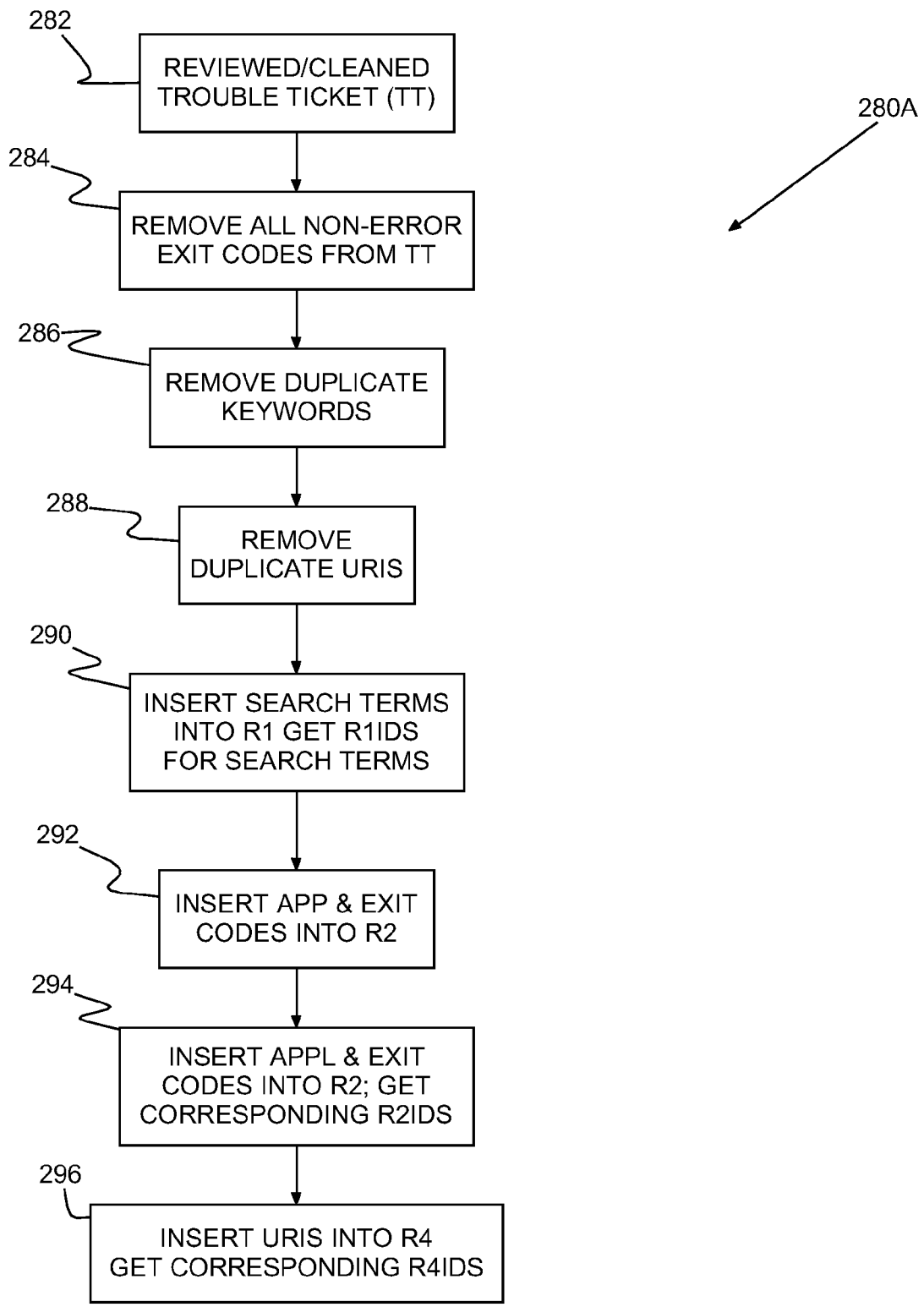
FIGS. 13A-B show a flow diagram example of updating the solution database.
Figure 13B:
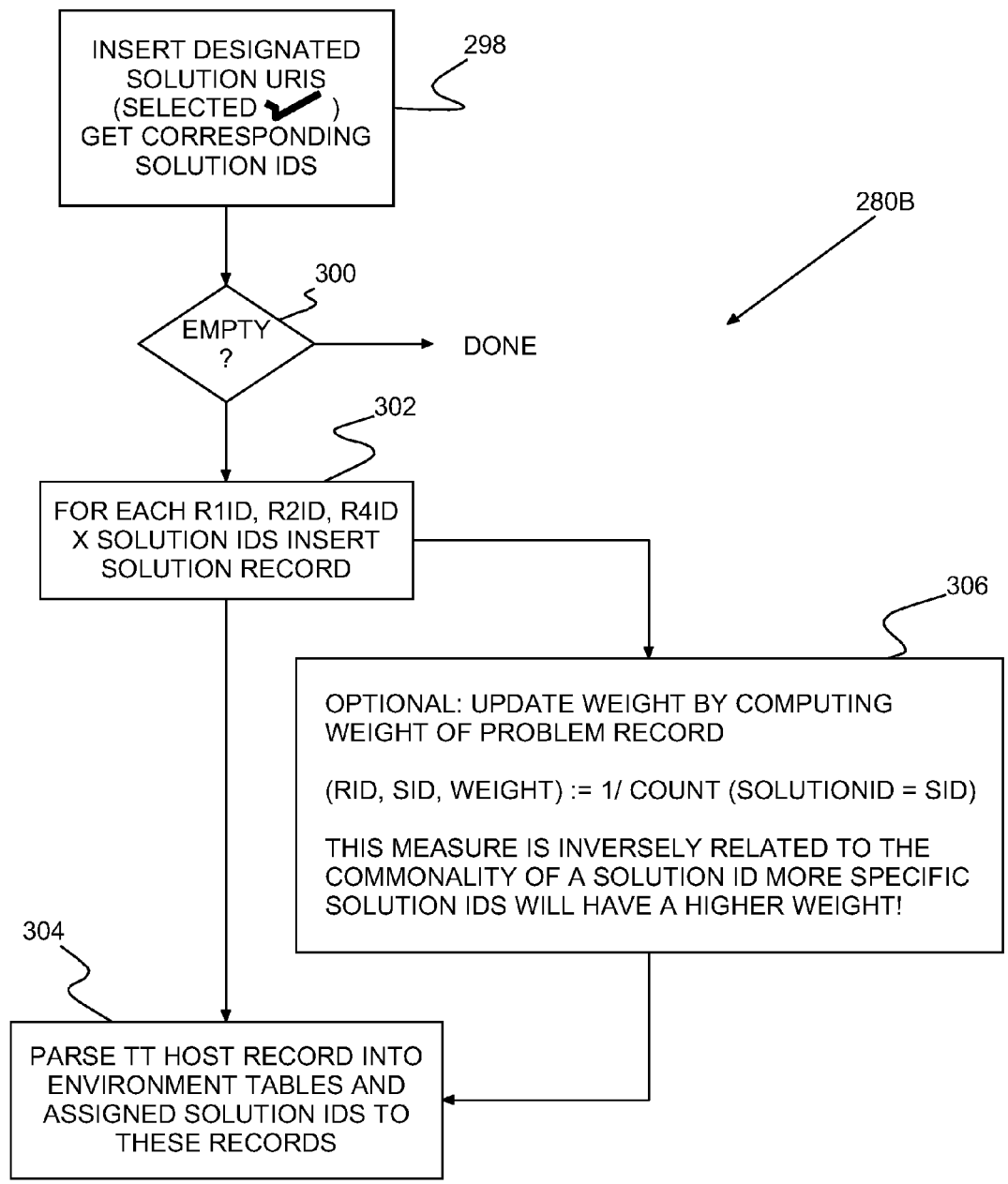

FIGS. 13A-B show a flow diagram example 280A-B of steps in updating the solution database. In step 282 a trouble ticket is reviewed and/or cleaned. In step 284 all non-error exit codes are removed from the trouble ticket. In step 286 any duplicate key words are removed from the trouble ticket. In step 288 duplicate URIs are removed from the trouble ticket. In step 290 search terms are inserted into the first relation, e.g., 1200 in FIG. 4 and first relation IDs are retrieved for the search terms. In step 292 application and exit data are inserted into second relation, e.g., 1294 in FIG. 4. In step 294, application and exit codes are inserted into third relations, e.g., 1206 in FIG. 4 and, corresponding second relation IDs are retrieved. In step 296 URIs are inserted into fourth relations, e.g., 1208 in FIG. 4 and, corresponding fourth relation IDs are retrieved. In step 298, URIs are selected, designated/selected solution URIs are inserted and any corresponding solution IDs are retrieved. In step 300 a determination is made whether the corresponding solution queue is empty and, if so, the update is complete. Otherwise in 302, solution records are inserted for each of the four relations into the solution database. Then, in step 304 the trouble ticket host record is parsed into environment tables and assigned solution IDs. Optionally, prior to parsing, in step 306 the problem record may be weighted with more specific solution IDs having a higher weight and, the weighted record is passed to the parsing step 304. So, for example with the weight for a particular solution being inversely related to the commonality Solution ID (SID), the weighting relationship may have the form:

WEIGHT OF PROBLEM RECORD(*RID, SID*, weight):=1/count.

FIG. 14 shows a flow diagram example 310 of identifying a solution based on intercepted behavior indicated in a trouble ticket 122. In 312 matching first relations are selected from the solution database 116 with keywords that match between the solution database 116 and the behavior record. Each matching solution is identified with a solution ID 314, counted 316 and provided with an environment score 318. The environment score is a measure of the difference between the trouble ticket host data and a solution ID environment map in the solution database. A combined score 320 is derived for each identified solution and may be, for example, a function of the ratio of the respective count 316 and the sum of counts, the respective environment score 318 and the relation weight. In 322 matching second relations are selected that match application names and exit codes between the solution database 116 and the behavior record. Again, each matching solution is identified with solution ID 324, counted 326 and provided with an environment score 328. In 332 matching forth relations are selected that match URIs between the behavior records and the behavior record. Each of these matching solutions is identified with solution ID 334, counted 336 and provided with an environment score 338. Matching application scores and URI scores are ranked 340 for each solution ID according to the sum of the respective combined scores. Then, in step 342 the solution IDs are displayed in a rank order.

Advantageously, the present invention provides a specialized client-side agent for proactive support notification with signature based two dimensional scoring, and based on time thresholds for user behavior in order to determine problem severity. User problems are automatically detected and problem determination may be automatically entered using user behavior analysis in order to initiate a help desk support request. Automatic problem detection may be from user behavior based on keywords, application, and web usage, in order to proactively collect troubleshooting information. Search terms may be automatically matched as entered into a Web search engine (e.g., Google) or computer system help function (e.g., Windows help) to a support desk database regarding known infrastructure problems. Customer trouble tickets are automatically routed with a support request to an IT support staff based on the signature of support requests entered into Web search engines or help functions of the operating system. Results from previously solved problems are shared within the user community.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A proactive problem resolution system comprising:
   a plurality of user sensors collecting data on computer terminal interactions with applications displayed on a computer terminal, wherein the user sensors include a keystroke logger and a program exit code interceptor;
   a sniffer agent monitoring user sensor results and identifying computer terminal interaction patterns indicating a user at said computer terminal is encountering a problem;
   a behavior database including previously encountered behavior that indicates user problems, said sniffer agent comparing identified said patterns with behavior associated with previously encountered said user problems;
   a solution database including identified solutions for said previously encountered user problems; and
   a proactive log storing collected said user sensor results.

2. A proactive problem resolution system as in claim 1, wherein said plurality of user sensors include, a help function interceptor, an Internet search interceptor and.

3. A proactive problem resolution system as in claim 1, wherein said plurality of user sensors and said sniffer agent are located on said computer terminal, and said sniffer agent selectively generates trouble tickets for user behavior that indicates a corresponding problem.

4. A proactive problem resolution system as in claim 3, wherein said sniffer agent presents a query on said computer terminal responsive to identifying a corresponding problem, said query allowing a user to request help desk assistance.

5. A proactive problem resolution system as in claim 1, wherein said behavior database includes a plurality of behavior records, each behavior record including relations indicating user behavior for a previously encountered problem, said relations comprising:
   keyword search terms encountered;
   exit code exceptions generated;
   applications launched; and
   uniform resource identifiers (URIs) visited.

6. A proactive problem resolution system as in claim 1, wherein said relations indicate a count for all occurrences of keywords, exit codes, and URIs.

7. A method of supporting product users, said method comprising:

monitoring activity on a user terminal with user sensors, wherein the user sensors include a keystroke logger and a program exit code interceptor;

logging monitored said activity indicative a potential problem with a supported product being encountered at said user terminal;

determining whether said monitored activity matches previously logged problem behavior;

searching for a previously identified solution to each matched problem; and presenting a corresponding said previously identified solution at said user terminal.

8. A method as in claim 7, wherein monitoring activity comprises extracting behavior from said monitored activity, extracted said behavior including keyword search terms used, exit code exceptions generated, applications launched, and uniform resource identifiers (URIs) visited.

9. A method as in claim 7, wherein determining whether said monitored activity matches previously logged problem behavior comprises comparing said monitored activity against problem behavior data stored in a problem database and associated with previously encountered product problems.

10. A method as in claim 7, wherein before searching for a previously identified solution, said method further comprises:

generating a user behavior record based on said monitored activity logged over a period of time;

matching said user behavior record with previously stored user behavior;

scoring matched said user behavior;

checking whether the score for said matched user behavior exceeds a threshold value; and whenever said score exceeds said threshold value, generating a preliminary trouble ticket.

11. A method as in claim 7, after searching for a previously identified solution, said method further comprises:

generating a trouble ticket; and forwarding said generated trouble ticket to a help desk.

12. A method as in claim 11, wherein said trouble ticket comprises:

a time field indicating when said trouble ticket was generated;

a host field indicating system information when said logged user behavior occurred; and a behavior field indicating said logged user behavior.

13. A method as in claim 12, wherein said trouble ticket further comprises:

a user field identifying a particular user;

an assigned category field indicating a selected problem category for said supported product; and a comment field indicating optional comments added when said trouble ticket was created.

14. A method as in claim 7, after searching for a previously identified solution, said method further comprises presenting a help query at said user terminal.

15. A method as in claim 14, wherein whenever a help request is received responsive to a presented said help query, said method further comprises:

generating a trouble ticket; and forwarding said generated trouble ticket to a help desk.

16. A method as in claim 15, wherein generating the trouble ticket comprises:

presenting a list of experienced analysts for matched problem;

receiving an analyst selection; and identifying a selected said analyst with said matched problem, said generated trouble ticket being forwarded to said selected analyst.

17. A method as in claim 15, said method further comprising:

sharing a help session between said user terminal and a help desk terminal presenting a help query at said user terminal.

18. A method as in claim 17, wherein after a problem is resolved with help desk support, said method further comprises:

closing said trouble ticket;

logging newly encounter behavior; and adding a new solution to a solution database, said solution database being searched for a previous solution.

19. A method as in claim 18, wherein closing the trouble ticket comprises updating the solution database.

20. A method as in claim 17, wherein updating the solution database comprises scoring relations for previously identified solutions based on a frequency of occurrence of each solution.

21. A computer program product for providing product support to product users on user terminals, said computer program product comprising a computer usable medium having computer readable program code thereon, said computer readable program code comprising:

computer readable program code means for remotely monitoring activity on one or more user terminals with user sensors, wherein the user sensors include a keystroke logger and a program exit code interceptor;

computer readable program code means for logging monitored activity, said activity indicative a potential problem with a supported product being encountered at said user terminal;

computer readable program code means for storing previously encountered problem behavior associated with supported products and corresponding solutions to said previously encountered problem behavior;

computer readable program code means for determining whether said monitored activity matches stored said previously encountered problem behavior;

computer readable program code means for searching for corresponding solutions for matched problems;

computer readable program code means for selectively generating and forwarding trouble tickets to a help desk responsive to failing to find a corresponding solution; and computer readable program code means for remotely presenting each identified said corresponding solution at said user terminal.

22. A computer program product as in claim 21, wherein the computer readable program code means for monitoring comprises computer readable program code means for sensing user behavior activity.

23. A computer program product as in claim 22, wherein the computer readable program code means for sensing user behavior activity comprises computer readable program code means for sensing keyword search terms, computer readable program code means for sensing generated exit code exceptions, computer readable program code means for sensing launched applications, and computer readable program code means for sensing visited uniform resource identifiers (URIs).

24. A computer program product as in claim 21, further comprising:

computer readable program code means for generating user behavior records based on logged said monitored activity over a period of time;

computer readable program code means for matching said user behavior records with stored said previously encountered problem behavior;

computer readable program code means for scoring matched said user behavior and checking whether scores exceed a threshold value; and computer readable program code means for selectively generating a preliminary trouble ticket whenever said scores exceed said threshold value.

25. A computer program product as in claim 21, wherein said trouble ticket comprises:

a time field indicating when said trouble ticket was generated;

a host field indicating system information when said logged user behavior occurred; and a behavior field indicating said logged user behavior occurred.

26. A computer program product as in claim 25, wherein said trouble ticket further comprises:

a user field identifying a particular user;

an assigned category field indicating a selected problem category for said supported product; and a comment field indicating optional comments added when said trouble ticket was created.

27. A computer program product as in claim 21, further comprising computer readable program code means for presenting a help query at said user terminal.

28. A computer program product as in claim 27, wherein said computer readable program code means for presenting a help query further comprises:

computer readable program code means for presenting a list of experienced analysts for matched problems;

computer readable program code means for receiving an analyst selection; and computer readable program code means for identifying a selected said analyst with said matched problem, a corresponding said trouble ticket being forwarded to said selected analyst.

29. A computer program product as in claim 27, wherein said computer readable program code means for presenting a help query further comprises:

computer readable program code means for sharing a help session between said user terminal and a help desk terminal.

30. A computer program product as in claim 21, further comprising computer readable program code means for updating the solution database and scoring relations for previously identified solutions based on a frequency of occurrence of each solution.

* * * * *